United States Patent
Solheim et al.

(10) Patent No.: US 11,296,810 B2
(45) Date of Patent: Apr. 5, 2022

(54) ADD DROP STRUCTURE

(71) Applicants: GC Photonics Inc., Nepean (CA); Accelink Technologies Co., Ltd., Jiangxi (CN)

(72) Inventors: Alan Solheim, Stittsville (CA); Qinlian Bu, Hubei (CN); Weiqing Zhang, Hubei (CN); Chengpeng Fu, Hubei (CN); Lijie Qiao, Ottawa (CA)

(73) Assignee: Accelink Technologies Co., Ltd., Wuhan (CN)

( * ) Notice: Subject to any disclaimer, the term of this patent is extended or adjusted under 35 U.S.C. 154(b) by 0 days.

(21) Appl. No.: 16/474,131

(22) PCT Filed: Dec. 27, 2017

(86) PCT No.: PCT/CA2017/051607
§ 371 (c)(1),
(2) Date: Jun. 27, 2019

(87) PCT Pub. No.: WO2018/009521
PCT Pub. Date: Jul. 5, 2018

(65) Prior Publication Data
US 2019/0349111 A1 Nov. 14, 2019

Related U.S. Application Data

(60) Provisional application No. 62/530,901, filed on Jul. 11, 2017, provisional application No. 62/439,275, filed on Dec. 27, 2016.

(51) Int. Cl.
H04J 14/02 (2006.01)
H01S 3/067 (2006.01)
(Continued)

(52) U.S. Cl.
CPC ...... H04J 14/0204 (2013.01); H01S 3/06716 (2013.01); H01S 3/094003 (2013.01);
(Continued)

(58) Field of Classification Search
CPC ............ H01S 3/094003; H01S 3/06716; H04J 14/0204; H04Q 11/0005; H04Q 2011/0047; H04Q 2011/0009; H04Q 2011/0016
See application file for complete search history.

(56) References Cited

U.S. PATENT DOCUMENTS 6,434,295 B1 * 8/2002 MacCormack ......... H01S 3/067
385/27
9,252,910 B2 * 2/2016 Roorda ............... H04J 14/0212
(Continued)

*Primary Examiner* — Mina M Shalaby
(74) *Attorney, Agent, or Firm* — Teitelbaum & Bouevitch; Neil Teitelbaum

(57) ABSTRACT

An optical circuit includes: a multicast-and-select (MCS) switch and multiple optical selective devices coupled to output ports of the MCS switch. The selective devices may select a single optical channel by blocking some of wavelengths of light passing therethrough and passing at least one other wavelength. The selective devices may be wave blockers or tunable optical filters. The optical circuit further includes an optical amplifying array, wherein each amplifier has an input port optically coupled to one of the selective devices. At least some of the amplifiers have pump light ports for receiving at least a portion of the pump light from one or more laser pumps or from another of the optical amplifiers, wherein the pumps are capable of providing pump light sufficient to fully saturate all of the rare earth doped optical fibers in the array.

11 Claims, 12 Drawing Sheets

(51) Int. Cl.
  *H01S 3/094* (2006.01)
  *H04Q 11/00* (2006.01)
(52) U.S. Cl.
  CPC . *H04Q 11/0005* (2013.01); *H04Q 2011/0009* (2013.01); *H04Q 2011/0016* (2013.01); *H04Q 2011/0047* (2013.01)

(56) References Cited

U.S. PATENT DOCUMENTS

| | | | |
|---|---|---|---|
| 9,899,792 B1* | 2/2018 | Winzer | H01S 3/06754 |
| 2008/0131128 A1* | 6/2008 | Ota | H04J 14/0201 |
| | | | 398/79 |
| 2010/0129082 A1* | 5/2010 | Zhong | H04J 14/0204 |
| | | | 398/83 |
| 2010/0272441 A1* | 10/2010 | Boduch | H04J 14/0206 |
| | | | 398/83 |
| 2012/0195594 A1* | 8/2012 | Sakauchi | H04J 14/02 |
| | | | 398/48 |
| 2014/0293393 A1* | 10/2014 | Fondeur | G02F 1/21 |
| | | | 359/288 |
| 2015/0295382 A1* | 10/2015 | DiGiovanni | G02B 6/036 |
| | | | 359/341.33 |
| 2019/0165877 A1* | 5/2019 | Way | H04J 14/0212 |

* cited by examiner

ADD DROP STRUCTURE

RELATED APPLICATION DATA

This application is the national stage entry of International Application No. PCT/CA2017/051607 filed Dec. 27, 2017, which claims priority to U.S. provisional application No. 62/530,901 filed Jul. 11, 2017 and U.S. provisional application No. 62/439,275 filed Dec. 27, 2016. The entireties of these applications are hereby incorporated by reference.

TECHNICAL FIELD

The present disclosure relates to optical communication systems and, in particular, to reconfigurable optical add/drop modules.

BACKGROUND OF THE INVENTION

A growing demand for data requires further increase in capacity of optical communication systems, both in the number of wavelengths supported per optical fiber and in the data rate per wavelength. Optical channels are often routed using reconfigurable optical add/drop modules (ROADMs). ROADM systems are currently designed so as to achieve, or advance towards, colorless, directionless, and contentionless (CDC) properties. The directionless property may be understood as the ability to route a wavelength across any viable path in the network, the colorlessness—as the ability to receive any wavelength on any port, and the contentionlessness allows adding or dropping of duplicate wavelengths. However, the full CDC requires a very high number of transmitters and receivers, and the industry uses the term "CDC" as including ROADMs which are nearly colorless, directionless, and contentionless. In order to achieve or further approach to the full CDC, it is desirable to support as many transmitters and receivers (TRs) for the same number of add/drop ports as possible.

Conventional CDC add/drop structures are designed for adding and dropping single-wavelength channels. However, in order to increase the capacity per transceiver, the industry is moving towards transmitters supporting super channels, which may have a wider channel bandwidth or include multiple wavelengths emitted by a single transmitter.

Accordingly, it is desirable to provide a high-performance, cost-effective CDC add/drop structure, which satisfies practical requirements of contentionless, directionless and colorless multiplexing for both single-wavelength channels and super channels.

SUMMARY OF THE INVENTION

In accordance with an aspect of the invention, there is provided an optical system comprising a first drop-side optical circuit. The first drop-side optical circuit includes: a multicast-and-select (MCS) switch having a plurality of input ports and a plurality of output ports; a plurality of selective devices, each for blocking some of wavelengths of light passing therethrough and for passing at least one other wavelength therethrough so as to provide output to an output port of said selective device, wherein each of the plurality of selective devices has an input port optically coupled to an output port of the MCS switch; and, an optical amplifying array comprising a plurality of optical amplifiers, each having an input port optically coupled to one of the selective devices for receiving an optical signal to be amplified, wherein each of the plurality of optical amplifiers comprises one or more rare earth doped optical fibers for amplifying an optical signal propagating therethrough and has an output port for providing an amplified optical signal. The optical amplifying array includes one or more laser pumps for providing pump light sufficient to fully saturate all of the rare earth doped optical fibers in the optical amplifying array; wherein a number of the one or more laser pumps is less than a number of the plurality of optical amplifiers. Each of at least some of the optical amplifiers has a pump light port for receiving at least a portion of the pump light from the one or more laser pumps or from another of the optical amplifiers.

In accordance with another aspect of the invention, there is provided an optical system comprising a first drop-side optical circuit. Said first drop-side optical circuit includes: a multicast-and-select switch having a plurality of input ports and a plurality of output ports; and, a plurality of selective devices, each for blocking some of wavelengths of light passing therethrough and for passing at least one other wavelength therethrough so as to provide output to an output port of said selective device, wherein each of the plurality of selective devices has an input port optically coupled to one of the plurality of output ports of the MCS switch. Said selective devices may be tunable optical filters or wave blockers. One or more gain flattening filters may be used for distributed gain balancing along each optical path in the first drop-side optical circuit. Said optical system may also include a power-splitting circuit and a second drop-side optical circuit, wherein one or more of the input ports of the MCS of the second drop-side optical circuit are coupled to one or more of the output ports of the power-splitting circuit. Said optical system may include an add side optical circuit.

In accordance with yet another aspect of the invention, there is provided an optical system comprising an add side optical circuit, wherein the add side optical circuit includes an add-side optical amplifying array comprising a plurality of optical amplifiers, each having an input port for receiving an optical signal to be amplified. Each of said optical amplifiers comprises one or more rare earth doped optical fibers for amplifying an optical signal propagating therethrough and has an output port for providing an amplified optical signal. The add-side optical amplifying array comprises one or more laser pumps for providing pump light to all of the rare earth doped optical fibers in the add-side optical amplifying array, wherein a number of the one or more laser pumps in the add-side optical amplifying array is less than a number of the plurality of optical amplifiers in the add-side optical amplifying array. Each of at least some of the optical amplifiers in the add-side optical amplifying array has a pump light port for receiving at least a portion of said pump light from the one or more laser pumps of the add-side optical amplifying array or from another of the plurality of optical amplifiers of the add-side optical amplifying array.

The add side optical circuit further comprises: a plurality of add-side selective devices, each for blocking some of wavelengths of light passing therethrough and for passing at least one other wavelength therethrough so as to provide output to an output port of said selective device, wherein each of the plurality of add-side selective devices has an input port optically coupled to an output port of one of the plurality of amplifiers in the add-side optical amplifying array, and an add-side multicast-and-select switch having a plurality of input ports and a plurality of output ports, wherein each of the plurality of input ports is optically coupled to an output port of one of the plurality of add-side selective devices.

BRIEF DESCRIPTION OF THE DRAWINGS

Exemplary embodiments will now be described in conjunction with the drawings in which.

DETAILED DESCRIPTION OF THE INVENTION

Figure 1:
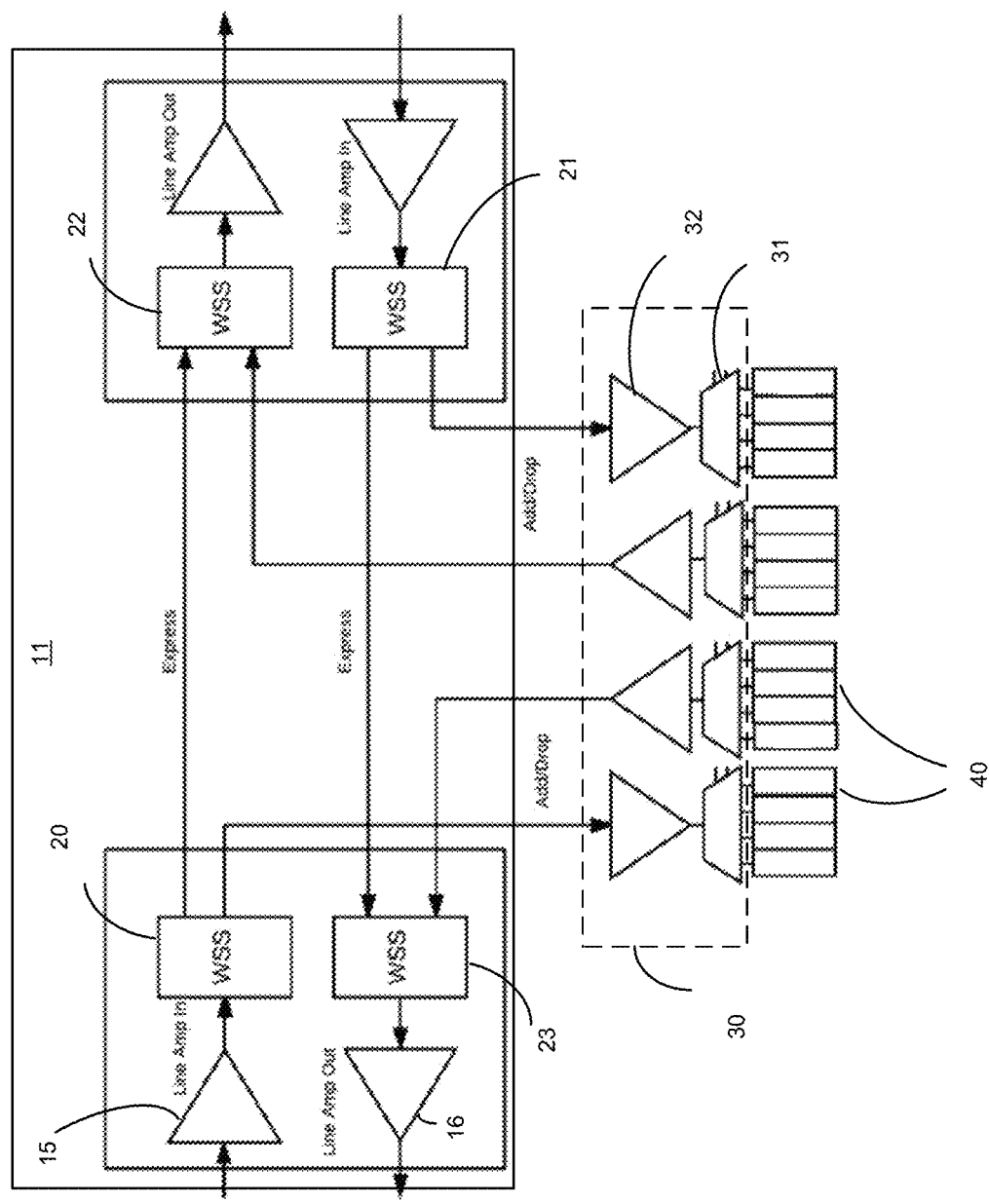
FIG. 1 is a nodal diagram illustrating select-and-select architecture.
Figure 2:
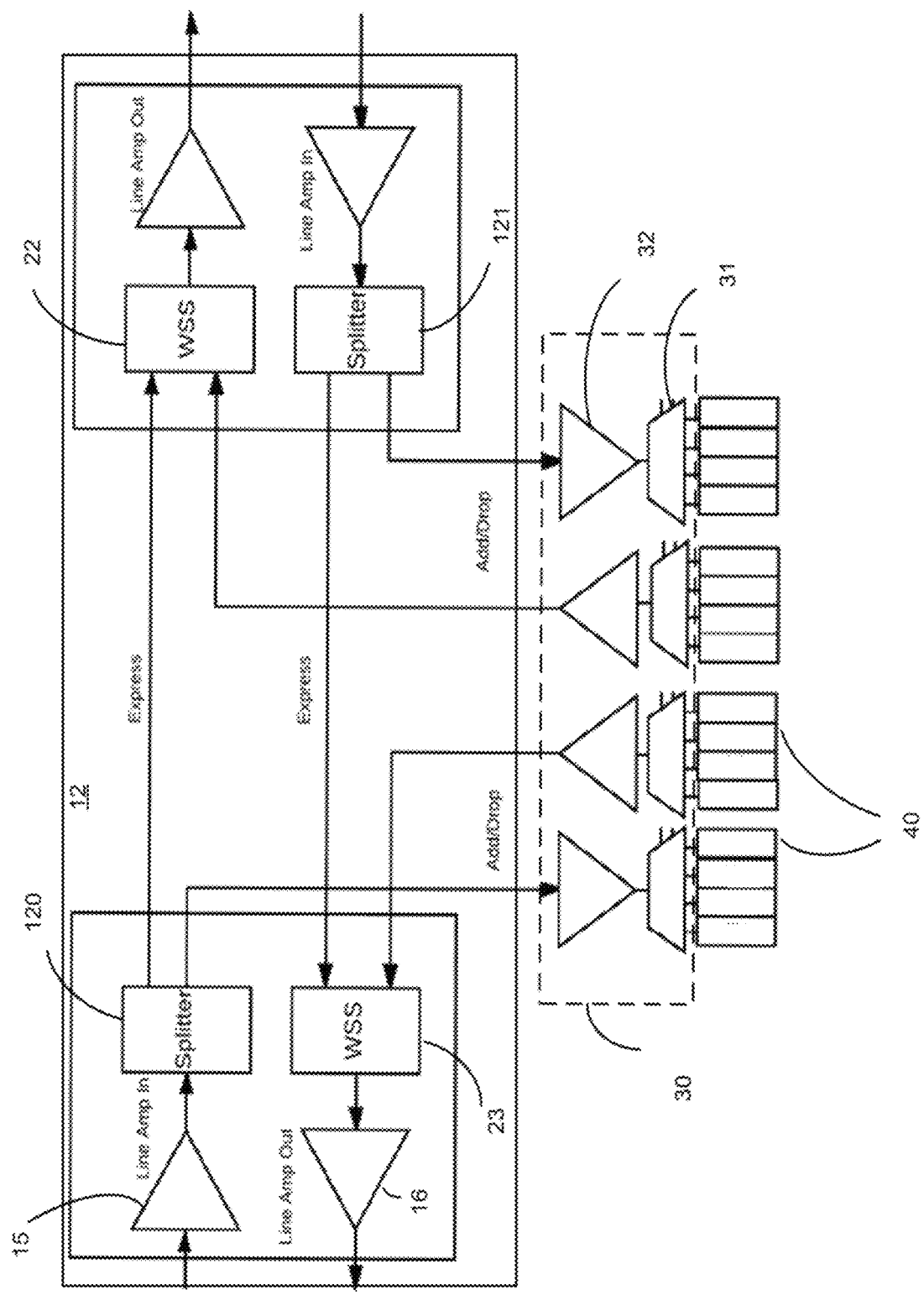
FIG. 2 is a nodal diagram illustrating broadcast-and-select architecture.

The add/drop system disclosed herein may be used in place of a conventional add/drop module 30 shown in FIGS. 1 and 2.

FIG. 1 illustrates the select-and-select architecture, including a ROADM node of degree 2, i.e. having 2 possible directions available for routing wavelengths on the multiplex or line side. Of course, the degree 2 is used for illustrative purposes only, and the ROADM node may have a higher degree. The node includes a Wavelength Selective Switch (WSS) block 11, the Add/Drop block 30, and transmitters 42 and receivers 41, also labeled together as TRs 40. The WSS block 11 includes input and output optical amplifiers 15 and 16, on the line side and WSS 20, which can route the lineside wavelengths either to the add/drop structure 30 or to another line direction. The add/drop block 30 includes wavelength mux/demux modules 31 and optical amplifiers 32 for overcoming the losses associated with the wavelength mux/demux modules.

FIG. 2 illustrates an alternative nodal architecture, the broadcast-and-select architecture, where the WSS Demux 20 is replaced with a power splitter 120.

Figure 3:
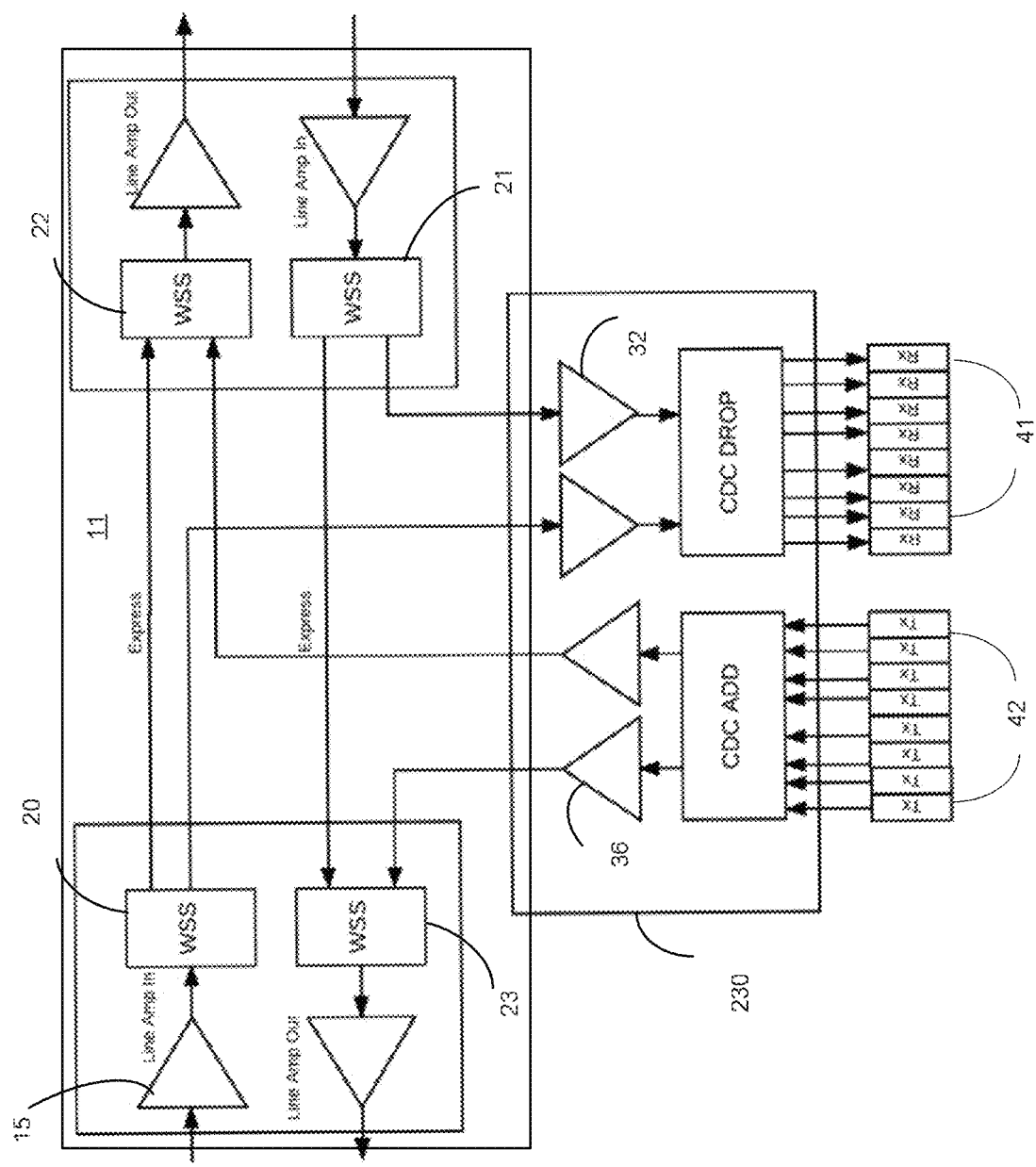
FIG. 3 is a ROADM functional diagram.

With reference to FIG. 3, an add-drop module 230 is a CDC or near-CDC ROADM. It is desirable that the add/drop module 230 provide as much add/drop capacity as possible, satisfy the CDC requirements as near as possible, and work with both, the select-and-select architecture shown in FIG. 1 and the broadcast-and-select architecture shown in FIG. 2, in other words, with the WSS block 11 (FIG. 1) or with the WSS/split block 12 (FIG. 2). Again, the degree of the modules 11 and 12 is not necessarily 2 and may vary. An input beam, which is a portion of light transmitted through the optical communication system, is provided to the drop side of the module 230 for further selection of desired wavelength(s). On the add side, the module 230 supplies one or more beams of light into the communication system. Here and elsewhere, a beam of light can either be a guided beam or an unguided beam.

Figure 4:
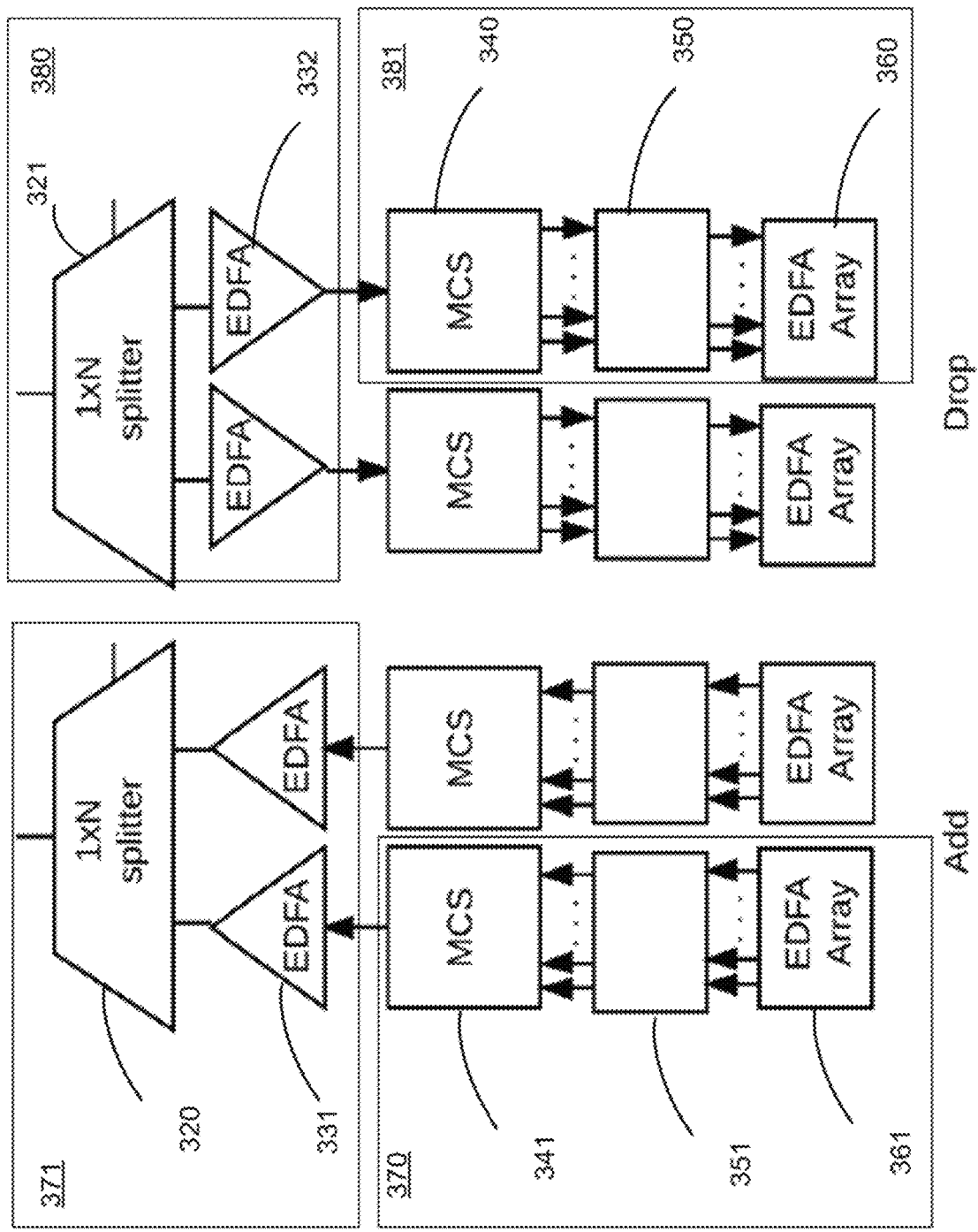
FIG. 4 illustrates an embodiment of an add/drop module.

FIG. 4 illustrates an embodiment of the add/drop system 230 disclosed herein, also referred to as an add/drop module 230. The left side of the drawing illustrates the add functionality, and the right side—the drop functionality.

The drop side may include an optional splitting circuit 380 and one or more switching circuits 381. In one embodiment, the splitting circuit 380 includes a power splitter 321, which has one input port and multiple output ports. The splitter 321 is a 1×N splitter; by way of example, N may be 2, 4 or 8. In operation, the input port of the splitter receives an input beam of light, which is a portion of light carried by an optical communication system. The beam may be separated from the express channel (FIG. 3) using the WSS 211 or a splitter such as the splitter 121 (FIG. 2). With reference to FIG. 4, the splitter 321 splits the received beam into N sub-beams and provides them to the output ports of the splitter.

The splitter 321 may be preceded by an optional optical amplifier 32 (FIG. 3), which amplifies the input beam before it is provided to the input port of the splitter 321. The splitter 321 may be followed by amplifiers 332 connected to receive a plurality of sub-beams from the splitter 321, one sub-beam per amplifier 332, for amplifying the particular sub-beam. In other words, the splitter 321 and amplifiers 32 and/or 332 form a splitting circuit 380 which performs both, power-splitting and amplification.

In one embodiment, the amplifiers 32 and 332 may be used in a same circuit, so that the beam is amplified before the splitting and the sub-beams are amplified after the splitting. In another embodiment, the splitting circuit 380 includes a cascade of power-splitters. By way of example, at least some and preferably all the sub-beams provided at the output ports of the splitter 321 may be amplified by one of the amplifiers 332 and further split by secondary power slitters, with possible further amplification. In other words, the power-splitting circuit 380 includes at least one optical power splitter, for receiving a light beam at an input port of the power-splitting circuit, splitting the light beam so as to obtain a plurality of sub-beams, and providing the plurality of sub-beams to output ports of the power-splitting circuit. Optical power splitters are known in the industry and are commercially available. In one embodiment, the power-splitting circuit 380 may be replaced with the amplifier 32.

The splitting circuit 380 may be followed by one or more switching circuits 381. Each switching module 381 of the drop side of the module includes a multi cast and select switch 340, with a plurality of input ports and a plurality of output ports.

Each MCS switch 340 may have one or more of its input ports coupled to the output ports of the splitting block, wherein one input port of the switch may receive one of the sub-beams provided at the output ports of the splitting circuit 380 (also referred to herein as a splitting block 380). In one embodiment, the number of the switches is equal to the number of sub-beams provided by the splitting block. Alternatively, the MCS switch 340 may receive an input beam from the WSS 21, wherein the beam may be amplified by the amplifier 32. In other words, the splitting block 380 is optional.

Figure 5:
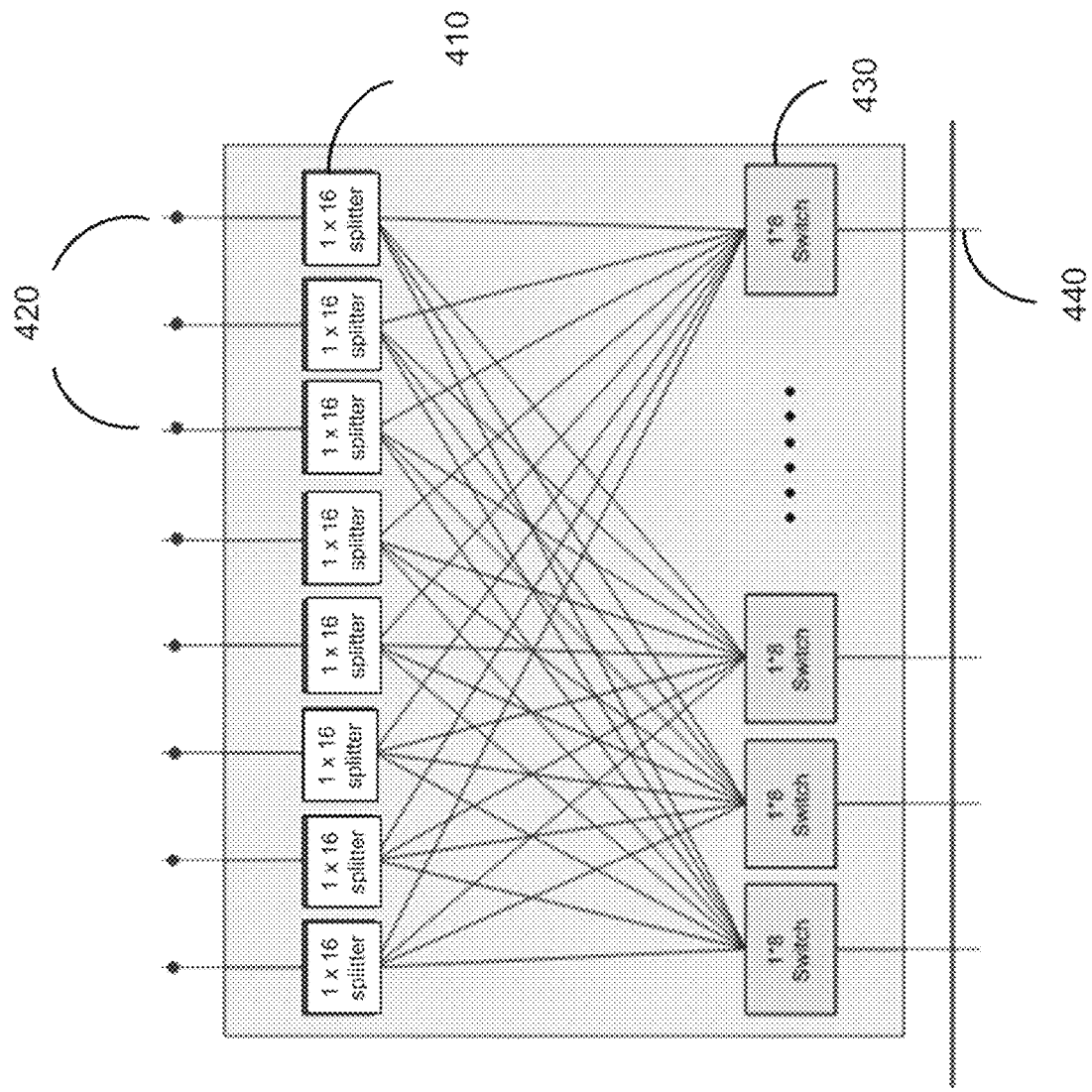
FIG. 5 is a schematic diagram of an MCS switch.

The MCS switches, such as the switches 340, are known in the field of optical communications. FIG. 5 is a schematic diagram of an MCS switch. On the drop side, a multicast and select switch may include a plurality of splitters 410, which multicast the sub-beams received at the input ports 420. Each of the switches 430 may direct light received at one of the input ports 420 to one of the output ports 440. In the particular embodiment, the switch has 8 input ports and 16 output ports. Of course, the number of ports in a MCS switch may vary.

The switching circuit 381 of the drop side of the module further includes a plurality of optical selective devices 350, each for blocking some of wavelengths of light passing therethrough, and for passing at least one other wavelength therethrough so as to provide output to an output port of said selective device. Each of the selective components 350 may select a particular channel, possibly a wavelength or a range of wavelengths. Each of the selective devices 350 has an input port optically coupled to one of the plurality of output ports of the MCS switch. Usually, each of the selective devices 350, also referred to as selective components or elements, has a single input port and a single output port.

The selective devices 350 may be used to select desired channel(s) intended to be dropped on a given port and to block undesired channels. This allows for use of both, coherent receivers and/or direct detection receivers which require per channel filtering. The selective devices may be tunable optical filters as discussed further with reference to FIG. 6, or wave blockers. The selective devices may be reconfigurable or tunable so that the wavelength(s) selected to pass through may be changed. The selective devices add to the flexibility of the add/drop system, which may be reconfigurable at the MCS switches and also at the selective devices 350.

Preferably, the plurality of selective devices 350 includes an array of wave blockers (WB). A wave blocker is an optical module which let selected wavelength(s) pass through and block all other undesired wavelengths. The "blocking" is understood as including substantial attenuation of the undesired portions of the spectrum, at least by 10 dB.

The wave blockers may be channelized wave blockers which only allow a specific channel size and spacing, or may be flex grid wave blockers so as to enable any size and spectral location of the selected channel with a specified frequency granularity. The wave blocker array can be constructed of either multiple single chip devices co-packaged into a single package, or a multichannel chip(s) that can support the number of required channels in the array.

A wave blocker may include a dispersive element, which separates an optical signal according to wavelength in free space, like gratings or prisms, or into a different waveguide, e.g. by an arrayed waveguide gratings (AWG). A wave blocker may include an optical steering element such as a liquid crystal on silicon (LCoS), microelectromechanical mirror array, liquid crystal (LC) switch array and so on, to steer selected signals to a second dispersive element so that the second dispersive element can combine them again and get them into the output optical port. Usually, the first and second dispersive element is same piece of grating or prism(s).

Any wave-blocker working in the C or L band, i.e. between 1530 and 1625 nm, could be used as the selective devices 350.

The drop-side switching module 381 further includes a plurality of amplifiers 360, each connected to one of the plurality of optical filters and possibly forming an amplifying array, for amplifying the output beams. The amplifiers of the add/drop module, such as the amplifiers 331, 332, 360, and 361, are preferably erbium-doped fiber amplifiers (EDFA), though any other amplifiers may be used. The output ports of the amplifiers may be coupled to the receivers 41. In some embodiments, the amplifiers 360 may be absent.

Advantageously, the add/drop module disclosed herein can support a higher number of TRs for the same number of add/drop ports on the WSS 20 and 21 (FIG. 3) than a conventional add/drop module. In this example, the power splitter 321 is shown with a 1×2 splitting ratio, however other ratios of the power split may be used, e.g. from 2 to 8. The higher power split ratios increase the number of TRs 40 that can be supported at the expense of a slight increase in the optical signal to noise ratio degradation on the drop path due to the increased loss in the power splitter. The selective devices 350 reduce the noise by blocking unwanted wavelengths and selecting only desired wavelengths.

In operation, in the select-and-select architecture, one or more WSS switches 20 and 21 (FIG. 3) may select M beams from the light propagating through the optical communication system. After the M beams have been selected, each of them may be split using M power splitters, such as the splitter 321 (FIG. 4), different splitters splitting different channels. The splitters 321 may be 1×N splitters, providing N sub-beams at the output ports of each splitter, in total N×M sub-beams, each possibly directed by one of the MCS switches 340 to one of the wave blockers 350 so that a particular wavelength, or a narrow range of wavelengths, could be provided to a particular receiver 41. By way of example, N may be 2, 4, or 8. M may be from 1 to $M_{max}$, wherein $M_{max}$ is limited by the available WSS, and the max number of WSS ports available today is 32. Each of the MCS switches may be coupled to receive one or more sub-beams from a particular splitter 321. In one embodiment, the N×M sub-beams may be switched by N switches 340, wherein each of the switches is coupled to receive M sub-beams, one from each of the M splitters 321. In another embodiment, one of the MCS switches may be coupled to receive more than one sub-beam from a particular splitter 321. The output ports of the MCS switched may be coupled to the selective devices 350, which may select a particular channel (wavelength) for further amplifying by the amplifying array 360 and providing output beams to receivers 41. Of course, the light beams may be amplified at a variety of locations on the drop side of the ROADM module 230, within the modules 380 and 381 (FIG. 4).

The drop-side optical amplifying array 360 may include a plurality of segments, also referred herein as optical amplifiers, each having an input port optically coupled to one of the selective devices 350 for receiving an optical signal to be amplified. Each of the segments has one or more pieces of rare earth doped optical fibers, i.e. pieces of optical fiber, for amplifying an optical signal propagating therethrough. The amplifier (segment) has an output port for providing an amplified optical signal. The optical amplifying array may include one or more laser pumps for providing pump light sufficient to fully saturate all of the rare earth doped optical fibers in the optical amplifying array, wherein a number of the laser pumps is less than a number of the optical amplifiers. At least some of the optical amplifiers may have a pump light port each, for receiving at least a portion of the pump light from the laser pump(s) or from another of the optical amplifiers (segments). Preferably, each segment of the array has a laser pump port for receiving at least a portion of the pump light. Such amplifying arrays, wherein the rare earth doped fibers may be fully saturated with the pump light, are referred to herein as over pumped arrays and discussed further with reference to FIGS. 10-12. The add side of the add/drop module may also include such an amplifying array.

In operation, in the broadcast-and-select architecture, a splitter positioned as the splitter 120 (FIG. 2) taps a beam of light which includes all the wavelengths propagating through the optical communication system. Another splitter 321 (FIG. 4) may split the input beam into sub-beams. Each of one or more MCS switches 340 has a plurality of input ports, wherein one or more of the input ports are coupled to the output ports of the splitter 321 so as to receive one or more sub-beams and direct them to the output ports of the switch, each output port optically coupled to one of the plurality of selective devices 350 so that a particular wavelength, or a range of wavelengths, could be provided to a particular receiver 41 coupled to the output port of one of the selective devices 350. Again, the light beams may be amplified at a variety of locations on the drop side of the ROADM module 230, within the modules 380 and 381 (FIG. 4).

Accordingly, the add/drop module disclosed herein may be used in the select-and-select architecture and in the broadcast-and-select architecture.

In these examples, the splitter 321 may be replaced with a splitting circuit including a cascade of several power splitters as discussed above.

With further reference to FIG. 4, the add side of the add/drop module 230 is illustrated in the left half of the drawing.

On the add side, an over pumped amplifier array may be used at the input, coupled to the input ports of the add/drop module, the ports used for connection of the transmitters 42. Since each of these amplifiers only needs to support the channel(s) coming from a single transmitter, the complexity and the required pump power are drastically reduced compared with a multi wavelength amplifier. The selective devices following the input amplifier can equalize the channel powers, if required, as well as block out any unwanted ASE from the input amplifier. Placing the optical amplifier 361 at the input to the add/drop structure as illustrated in FIG. 4, instead of after the MCS as in conventional designs, relaxes the output power requirements for the transmitters, and significantly improves noise performance.

With reference to FIG. 4, the add side of the module includes one or more switching circuits 370 and, optionally, a combining circuit 371. At least some of the input ports of the switching circuit 370 may be coupled to receive input sub-beams from transmitters 42 (FIG. 3), wherein each transmitter may have a tunable laser to be dynamically routed on any wavelength, in any direction, without contention from other wavelengths. The switching circuit 370 may include a plurality of input amplifiers 361, preferably in the form of an array, wherein each amplifier is coupled to receive an input sub-beam from one of the transmitters 42.

Figure 6:
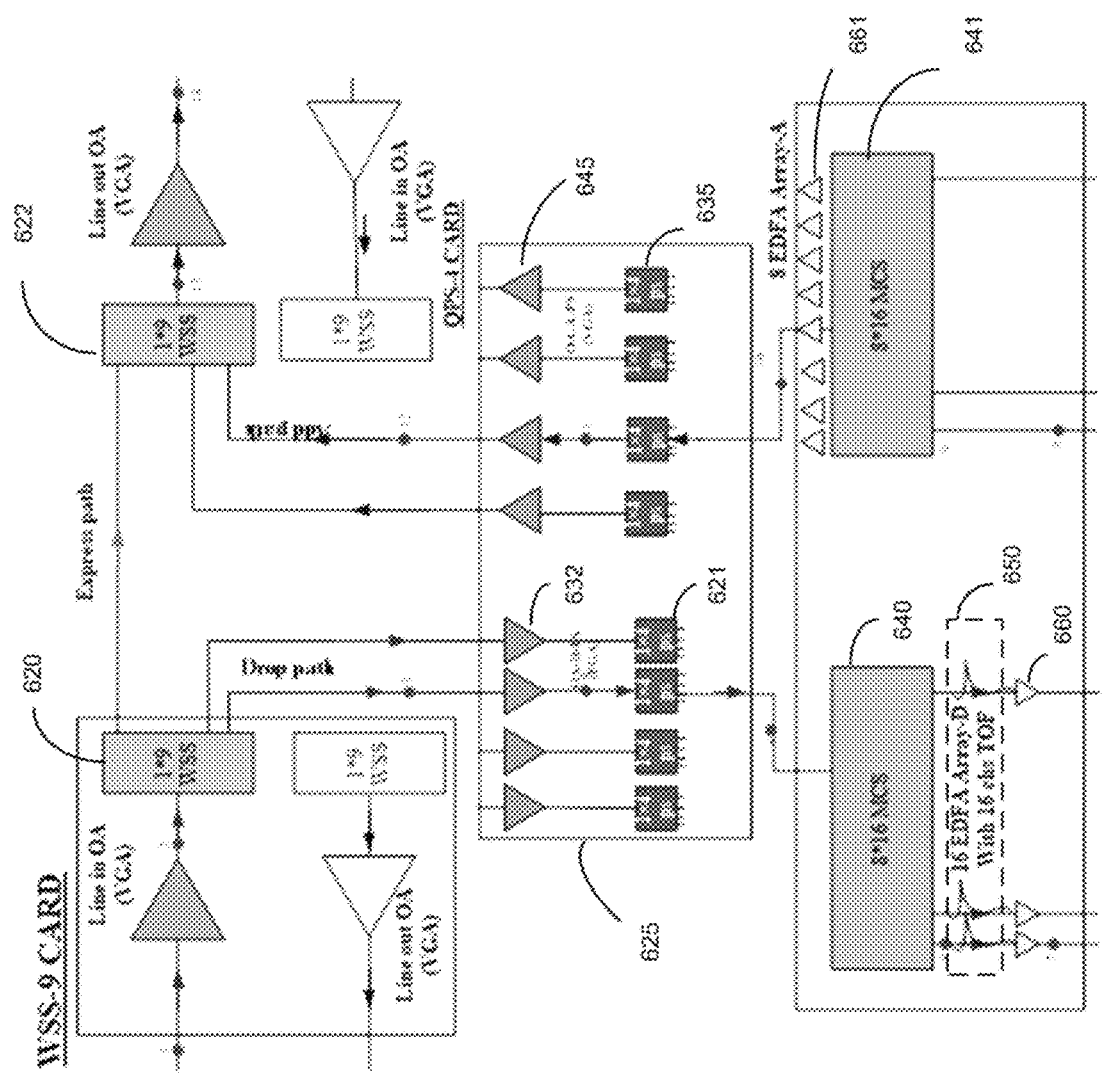
FIG. 6 is a schematic diagram of an exemplary implementation of an add/drop module.

Each of a plurality of optical selective devices 351 may be coupled to receive an amplified input sub-beam from one of the amplifiers 361. The wavelength-selective devices 351, e.g. wave blockers, attenuate the out of band noise, including the amplified spontaneous emission (ASE) from other amplifiers. Since the received sub-beams may be combined at the switches 341 and the combiner(s) 320, the noise introduced by the amplifiers 361 will be combined and further amplified by other amplifiers. The selective devices 351 allow through only the desired channels, and may be implemented the same way as the selective devices 350 on the drop side. In particular, the selective devices 351 may include tunable optical filters and/or filters including a selective absorber. The selective devices 351 on the add side are optional, however their use provides the advantage of improved optical signal to noise ratio (OSNR) performance. The initial amplifiers 361 are also optional as illustrated in FIG. 6, i.e. if the output power of the transmitters 42 is sufficiently high, the amplifiers 361 are not required.

The switching circuit 370 includes one or more MCS switches 341. The input ports of an MCS switch 341 are optically coupled so as to receive the input sub-beams from the transmitters 42 (FIG. 3), wherein the input sub-beams may be amplified by the amplifiers 361 and/or filtered by the wave blockers and/or optical filters 351 on the way between the transmitters 42 and the input ports of the MCS switches 341. The output ports of the MCS switches 341 may be optically coupled to amplifiers 331.

FIG. 5 illustrates the add-side MCS switches 341 (FIG. 4). Ports 440 serve as input ports of the MCS switch at the add side of the add/drop module, and ports 420—as output ports. The drop and add MCS switches are preferably of the same size. FIG. 5 shows an 8×16 MCS switch as an example.

The one or more power splitters 320, which serve as optical combiners, preferably have the same ratio as the splitter(s) 321 at the drop side. Each of the MCS switches 341 may direct each of received input sub-beams to an output port of the switch, coupled to one of the splitters/combiners 320. By way of example, the add side of the module 230 is shown in FIG. 3 to provide two input beams, one directed to the WSS 23, and another—to the WSS 22. Accordingly, in this example, the combining module 371 (FIG. 4) includes two splitters/combiners 320. The splitters/combiners 320 and the amplifiers 331 may be parts of the combining circuit 371. Alternatively, the splitter(s) 320 may be absent, and the combining circuit 371 would be reduced to the amplifier 331; then the amplifier 36 is not necessary.

FIG. 6 illustrates an exemplary implementation of the add/drop module structure disclosed herein with reference to FIG. 4. The WSS switches 620 and 622 correspond to the WSS switches 20 and 22 (FIG. 3). The WSS switches 620 and 622 are shown as 1×9 WSS, although this structure will work with any size of WSS module.

On the drop side, in the left side of the drawing, one or more input beams may be provided to the add/drop system. Although 4 beams are shown, a different number of beams may be selected by the WSS 620 and/or 622.

The exemplary add/drop implementation includes optical amplifiers 632, each for amplifying one of the input light beams. Each of the amplifiers 632 is optically coupled to one of power splitters 621. The module further includes one or more MultiCast and Select switches 640 such as illustrated in FIG. 5, and a plurality of selective devices in the form of Tunable Optical Filters (TOF) 650, for blocking some of wavelengths of a light beam passing therethrough and passing at least one other wavelength therethrough so as to provide an output beam to an output port of said selective device.

Any tunable filter working in C or L band could be used as selective devices in the add/drop module 230, including filters based on grating, Etalon on motor or on microelectromechanical systems (MEMS), Etalon, waveguide Mach-Zehnder interferometers, and fiber rings. Tunable optical filters usually pass (or block) a single wavelength or a group of adjacent wavelengths, with a bandwidth of up to 5 nm.

The module illustrated in FIG. 6 further includes an array of optical amplifiers 660, shown as amplifiers 360 in FIG. 4.

The amplifier 632 may precede the splitter 621 along the optical path of a drop channel, as shown in FIG. 6. Alternatively, the amplifier 632 may be replaced or used concurrently with a plurality of amplifiers which follow the splitter 621 as the amplifiers 332 (FIG. 4) follow the splitter 321. In other words, the drop side of splitting module 625 includes a splitter 632 for splitting a dropped channel, and one or more amplifiers 621 for amplifying the extracted channel before and/or after the split, wherein the splitter and amplifiers form the splitting circuit as discussed above. The splitting module 625 may be implemented in an OPS-4 card as illustrated in FIG. 6.

In the example illustrated in FIG. 6, the add side has no optical filters or wave blockers such as shown in FIG. 4. The module may include one or more MCS switches such as the MCS switch 641, followed by an optical amplifying array 661, followed by a power splitter 635 preferably of the same ratio as the splitters 621 on the drop side, followed by an optical amplifier 645.

Figure 7:
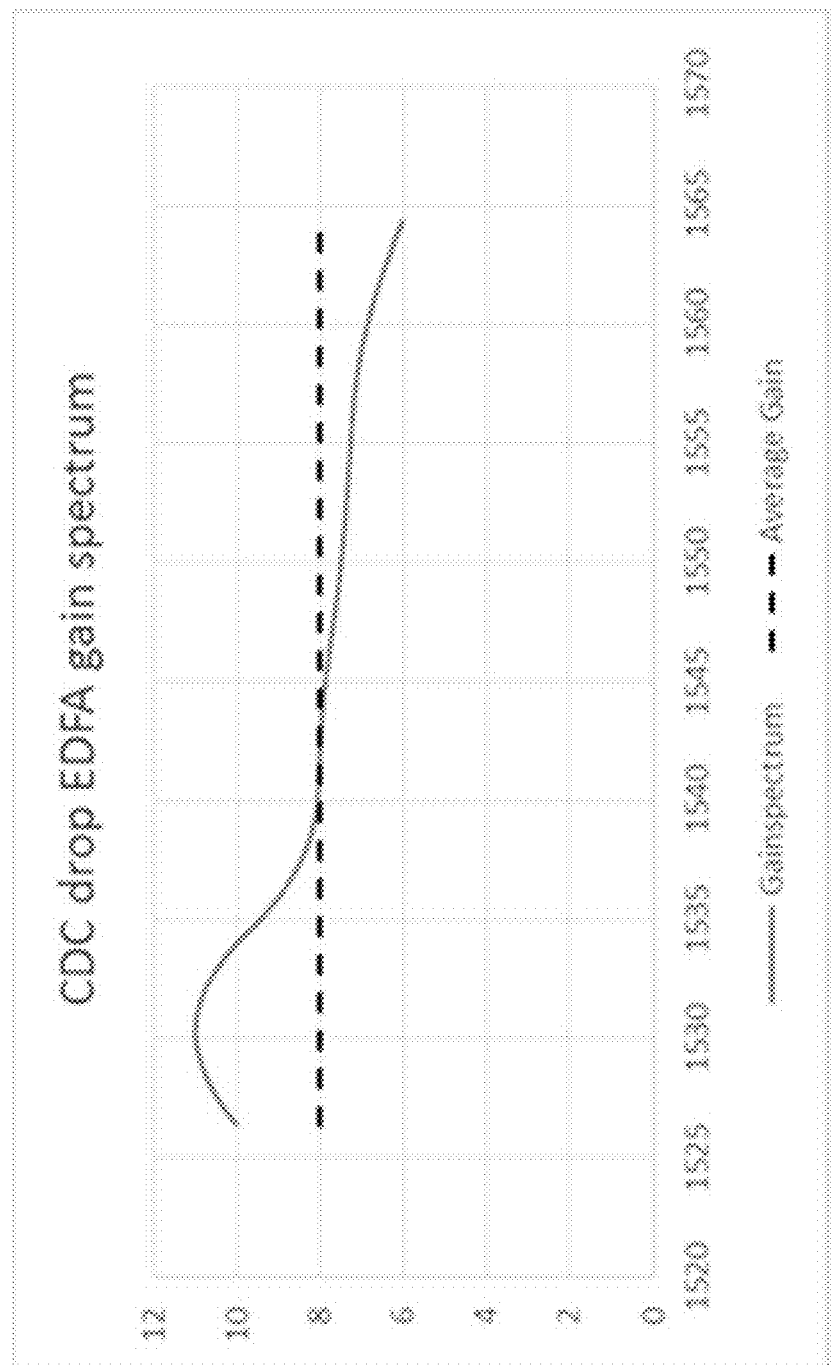
FIG. 7 is a plot of an EDFA gain spectrum.

Various embodiments of the add/drop module disclosed herein may include several splitters and amplifiers along each optical path. However, different wavelengths may be amplified not with a same coefficient. FIG. 7 presents a typical gain spectrum of an EDF amplifier. Such a spectrum presents a variety of problems, including increased crosstalk. Accordingly, it is desirable to flatten the gain spectrum of a particular amplifier or of the distributed amplifier along each optical path in the add/drop system. In other words, it is desirable for the total gain from the drop port of to the receiver be same for all wavelengths. It is also desirable for the total gain from a receiver to the add port should be same for all wavelengths.

Figure 8:
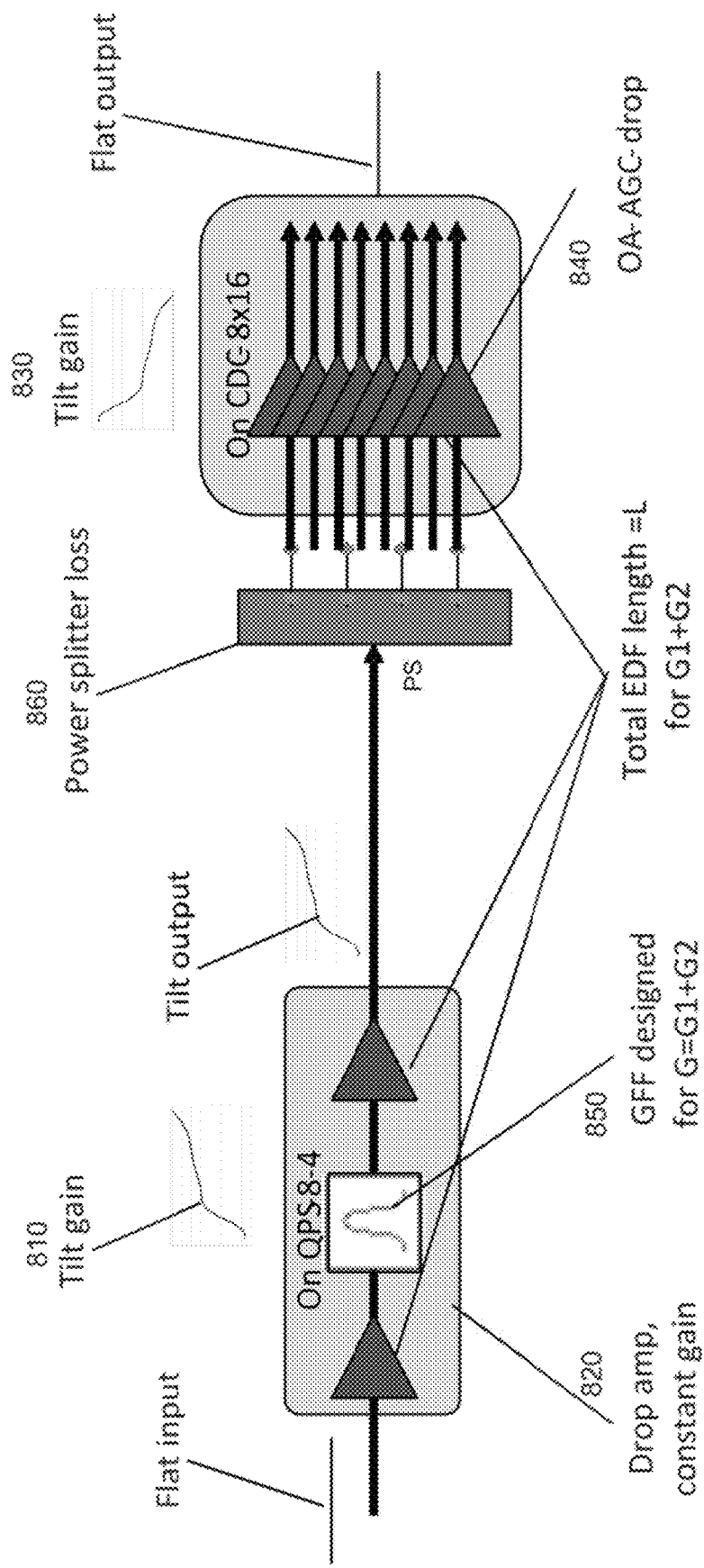
FIG. 8 is a schematic diagram of a drop-side distributed amplifier.

The amplifiers on the drop path may be designed as a distributed amplifier with gain compensation. FIG. 8 provides an example wherein the gain profile 810 of the first optical amplifier 820 is designed to compensate for the gain profile 830 of the final amplifier 840, which may be a segment in a an amplifier array, the segment coupled to receive a sub-beam from one of the selective devices 350 (FIG. 4). The spectrum 810 of first amplifier 820 has a positive tilt and the spectrum 830 of second amplifier 840 has a negative tilt, and the total gain spectrum is flat. The first optical amplifier 820 may include a gain balancing filter 850 designed to compensate for unevenness of the gain along each optical path on the drop side of the module. The gain balancing (or compensation) can be achieved by co-doping the amplifying waveguides with ytterbium. The first optical amplifier 820 shown in FIG. 8 may correspond to the amplifier 32 (FIG. 3) or one of the amplifiers 332, or their combination. In other words, all the amplifiers along each drop optical path, in combination, are configured for balancing gain along each path. The gain compensating filters, also referred to herein as gain flattening filters, may be part of the amplifier 32 (FIG. 3) and/or amplifiers 332.

With reference to FIGS. 4 and 8, in one embodiment, the optical system may include a drop-side optical circuit such as the circuit 381. The circuit includes an MCS switch having a plurality of input ports and a plurality of output ports, such as the switch 340. The circuit further includes selective devices, such as devices 350, each for blocking some of wavelengths of light passing therethrough and for passing at least one other wavelength therethrough so as to provide output to an output port of said selective device. Preferably each selective device has a single input port optically coupled to an output port of the MCS switch, and a single output port, which may be coupled to a receiver 41. Alternatively, the drop-side optical circuit may further include output amplifiers, so that the output port of one of the selective devices is coupled to one of the amplifiers, which may be, but not necessarily, part of an over pumped amplifying array.

The output amplifiers coupled to the selective devices are illustrated in amplifiers 840 (FIG. 8). The drop-side optical circuit may further include input amplifier optically coupled to an input port of the MCS switch and illustrated in the amplifier 820, including a GFF configured for gain balancing along all drop paths in the drop-side optical circuit, wherein the GFF is a single GFF in the first drop-side optical circuit.

The system may further include a splitting circuit and more drop-side optical circuits as discussed above with reference to FIG. 4. Each of the one or more input amplifiers may include a GFF such as the GFF 850.

Figure 9:
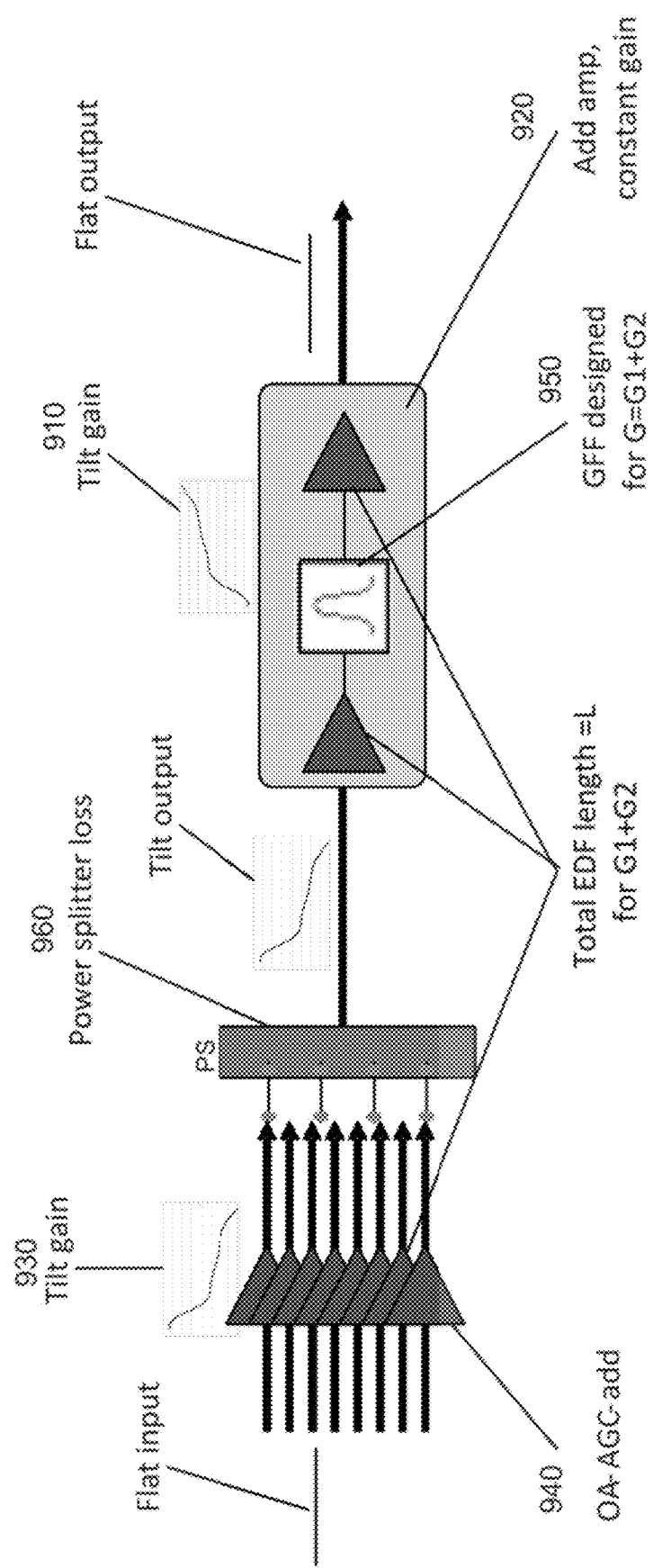
FIG. 9 is a schematic diagram of one embodiment of an add-side distributed amplifier.
Figure 11:
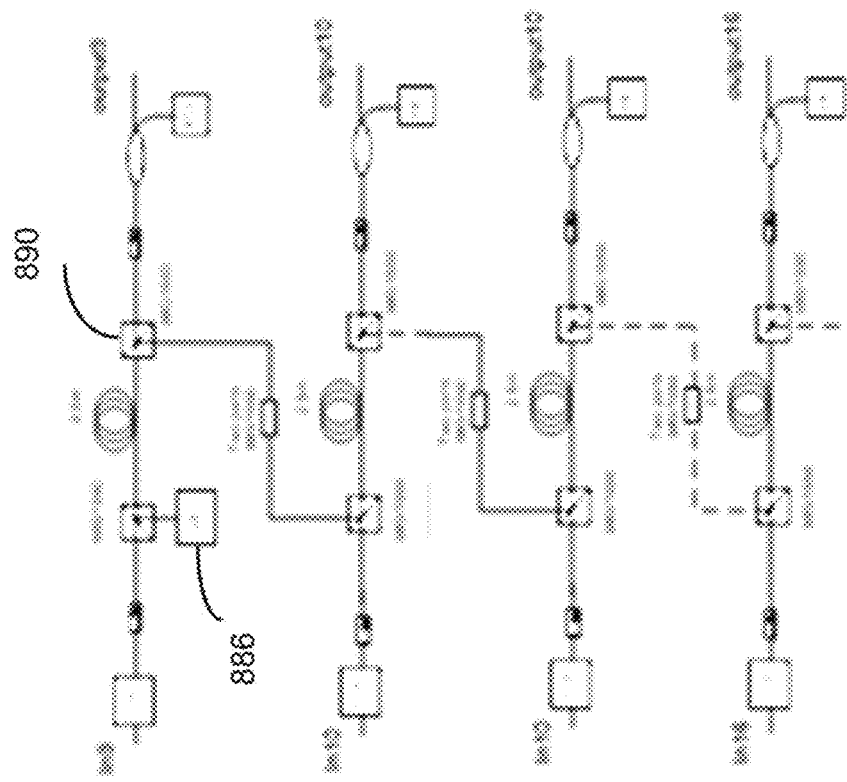
FIG. 11 is a schematic diagram of one embodiment of an add-side amplifying array; and, FIG. 12 is a schematic diagram of an amplifier array based on using a single saturation pump.
Figure 11:
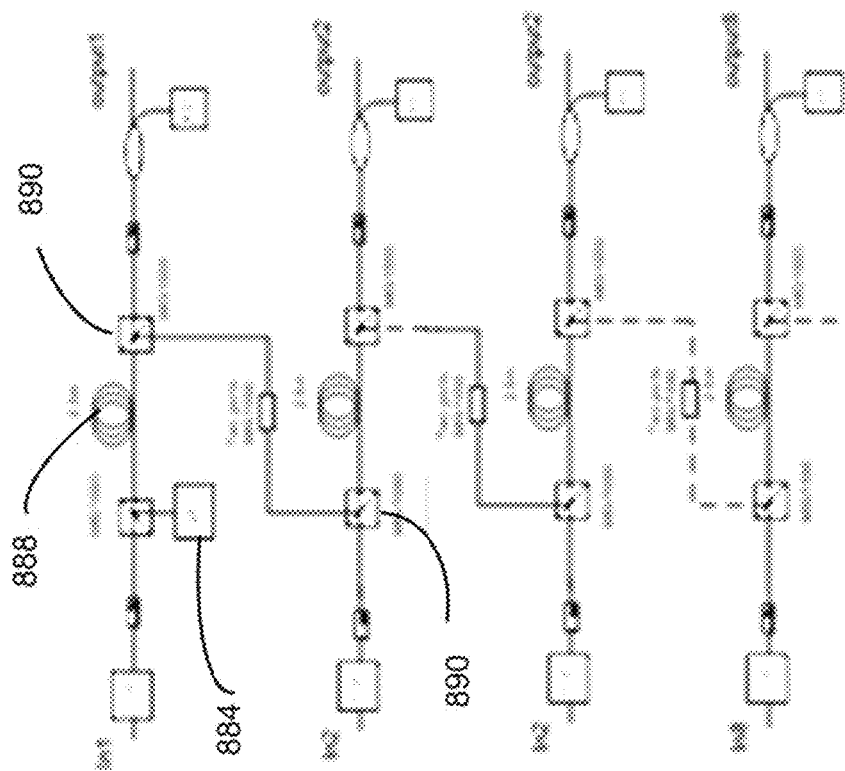
Figure 12:
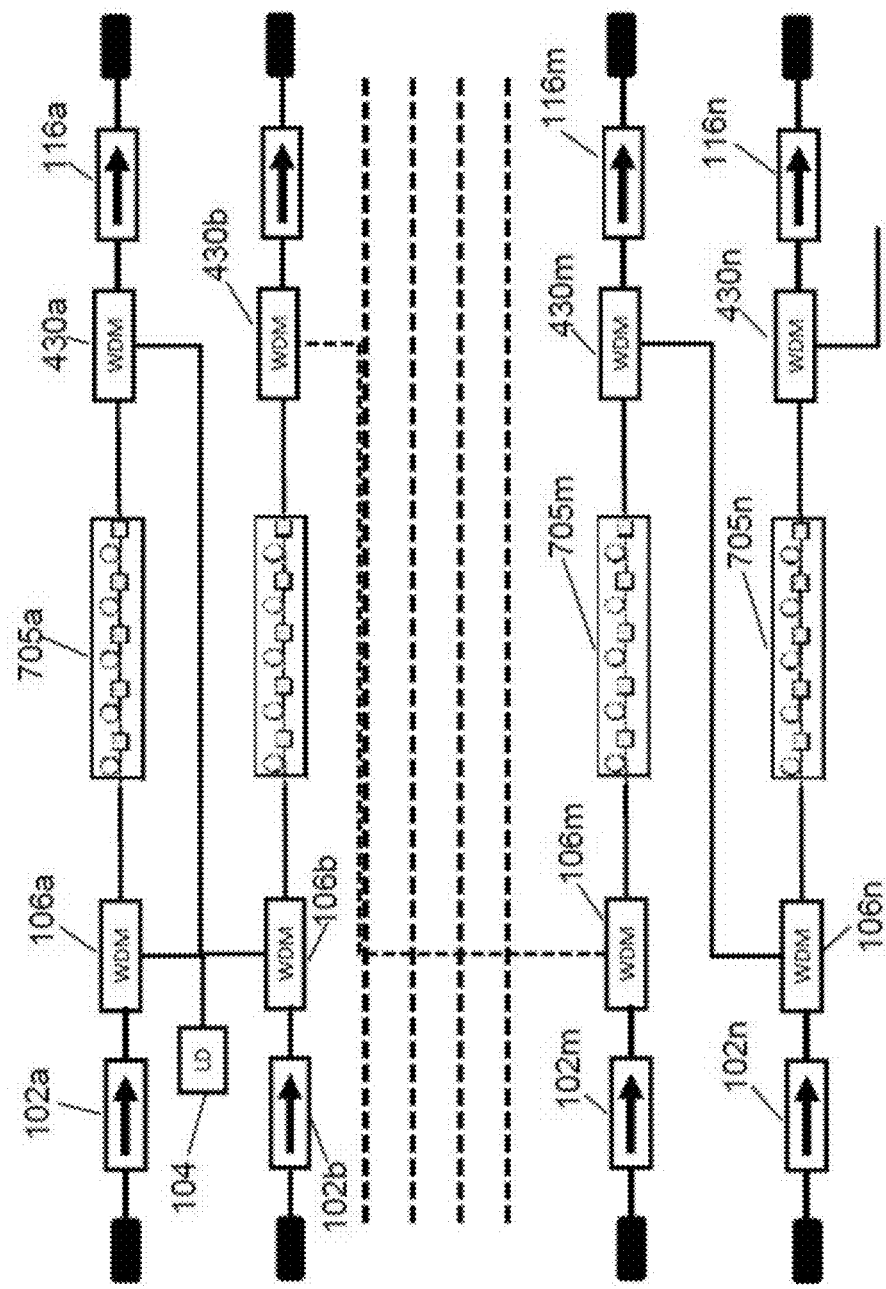

The add-side amplifiers may also be designed so as to balance the gain on all optical paths in the add side of the module. FIG. 9 provides an example, wherein the gain profile 910 of the top optical amplifier 920 includes a GFF 950 is designed to compensate for the gain profile 930 of the amplifier segment 940 in the amplifier array, which may be implemented in a cascade as illustrated in FIGS. 11 and 12. The gain balancing (or compensation) can be achieved by co-doping the amplifying waveguides or block with ytterbium. The top optical amplifier 920 shown in FIG. 9 may correspond to the amplifier 36 (FIG. 3) or one of the amplifiers 331 (FIG. 4), or their combination. In other words, all the amplifiers along each drop optical path, in combination, are configured for balancing gain along each path. The gain compensating filters, also referred to herein as gain flattening filters, may be part of the amplifier 36 (FIG. 3) and/or amplifiers 331. The distributed nature of the amplification on the add side also results in improved OSNR performance and lower cost when compared to conventional designs.

The gain balancing approach may be combined with using an over pumped amplifying array as discussed further. However, both methods may be used separately.

Turning back to the drop side of the module illustrated in FIG. 6, the TOF bandwidth may be chosen to be in the range of several nanometers, e.g. 5 nanometers, which allows for low cost manufacturing, while still filtering out of most of the optical power and passing through only the desired channel.

In general, the range of wavelengths which pass through a wave blocker is not necessarily as narrow as the bandwidth of a TOF. However, the add/drop module 230 includes wave blockers for selecting a single-wavelength channel or a super channel, which is typically characterized by a narrow bandwidth. In other words, each of the selective devices, including wave blockers, preferably has a narrow bandwidth, or may be configured to have such a bandwidth. If a wave blocker lets through light in several wavelength ranges, their cumulative bandwidth is still narrow.

Therefore, after several splits and provided only with narrow portion(s) of the spectrum, the final optical amplifier array 660 (FIG. 6) and array 360 (FIG. 4) only need to support a low power input in case of any selective devices 350.

Advantageously, the add/drop system is compatible with super channels, which may be combinations of multiple individual channels to support higher bandwidth TRs. The narrow bandwidth reduces the optical power carried into the final amplifier and hence into the receiver, as well as it reduces the out of band noise presented to the receiver, eliminating problems with receiver overload and improving the noise performance of the receiver. Due to the filtering by the selective devices 350, the final Optical Amplifier array 360 or 660 only needs to support a low power input, therefore an over pumped amplifier array may be used to dramatically simplify the design and reduce the cost.

Figure 10:
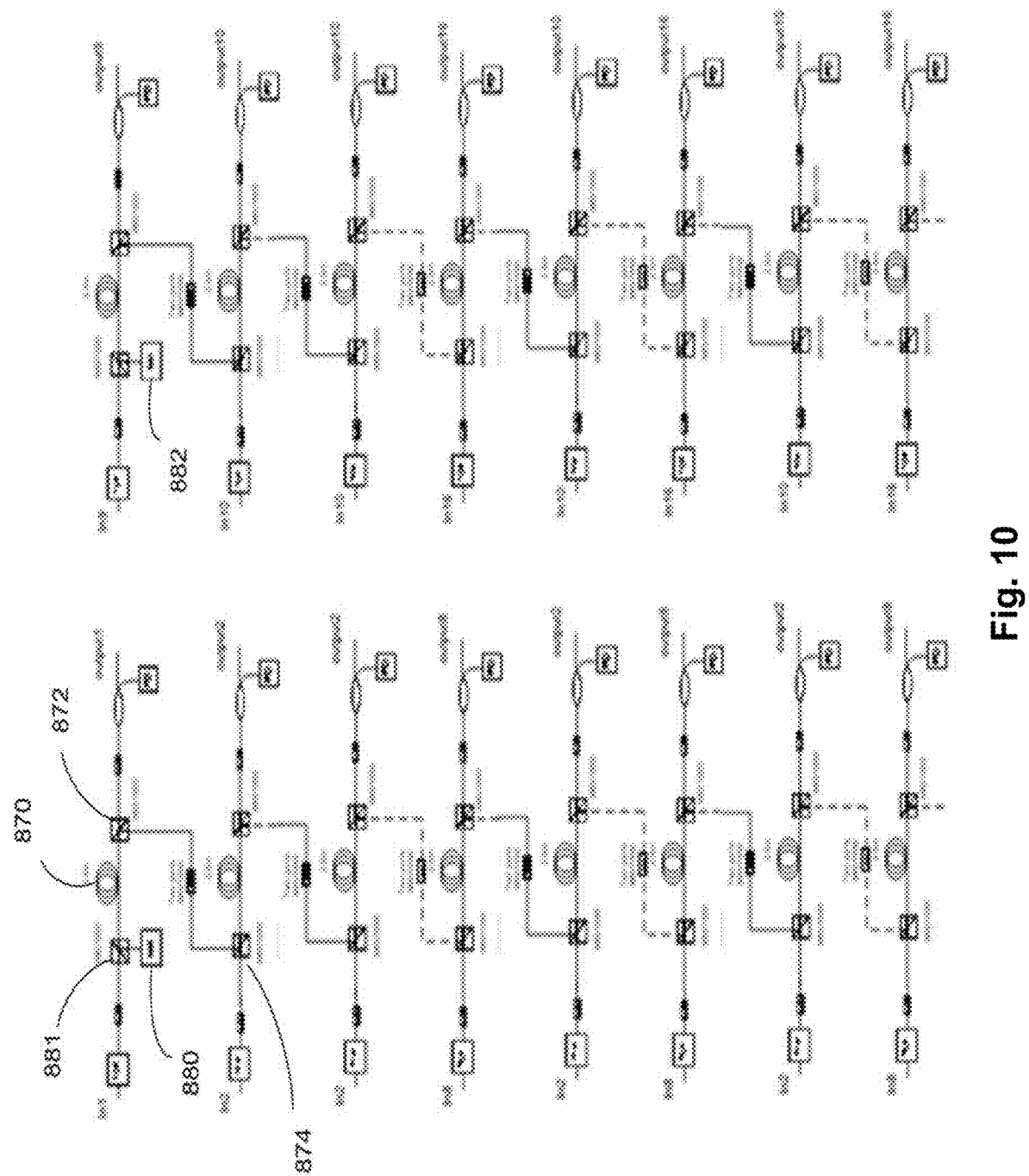
FIG. 10 is a schematic diagram of an amplifying array.

An example of the over pumped amplifier array for the drop side is shown in FIG. 10. Two laser pumps 880 and 882 are connected at both sides of a cascade of 16 short pieces of rare earth doped optical fiber 870, preferably Erbium doped fiber (EDF). In one embodiment of the array, only one pump is used. In another embodiment, there are more than two pumps, though fewer than amplifiers 870. Sharing the pump power among multiple amplifiers simplifies the design and reduces the cost.

The optical amplifying array, such as the array 660 (FIG. 6) and array 360 (FIG. 4), includes a plurality of optical amplifiers. Each amplifier has an input port optically coupled to one of the selective devices illustrated in devices 350 (FIG. 4) and 650 (FIG. 6), for receiving an optical signal to be amplified. Here and elsewhere, the ports may be any connections including cross sections of optical fiber, couplers, combiners, etc. Each of the amplifiers may include one or more rare earth doped optical fibers 670 for amplifying an optical signal propagating therethrough. In operation, the amplified optical signal is provided to an output of the amplifier. Further, each of the amplifiers may have a pump light port for receiving at least a portion of the pump light from the laser pump(s) or from another of the plurality of optical amplifiers.

In operation, the laser pump(s) provide non-varying pump light sufficient to fully saturate all of the rare earth doped optical fibers 670 in the optical amplifying array. In one embodiment, each of the erbium doped fibers has a length and erbium ion concentration such that, when fully saturated, amplification of less than 15 dB is provided by each amplifier to the signal to be amplified when passing through each amplifier.

Due to the high pump power relative to the signal power, the optical amplifiers operate in the linear regime and the average gain across all wavelengthsis fixed, eliminating the need for any complex control circuitry. With reference to FIG. 10, a first (top left) amplifier receives pump light from the pump 880 through a dichroic mirror 881, which serves as a pump light input port for the amplifier. The dichroic mirror 872 is used to guide the remaining pump power from the first amplifier to the second amplifier; the mirror 872 serves as a pump light output port in the first amplifier. The dichroic mirror 874 serves as a pump light input port in the second amplifier. The optical signal (sub-beam) received at an input port of a particular amplifier propagates, while being amplified, from the input port to the output port of that amplifier, substantially without being directed into another amplifier, differently from the pump light.

In some instances, a single gain Flattening Filter (OFF) may be used in the amplifier 332 (FIG. 4), or the amplifier 32 (FIG. 3) to achieve gain flatness on all of the possible drop paths. This eliminates the need for GFFs in each of the amplifier segments of the amplifier array 360 (or individual final amplifiers in some embodiments), further reducing the cost and complexity. Distributing the gain in this manner also reduces the OSIER degradation of the drop structure and reduces the required output power of the first amplifier. The net result of this design is a higher performance, lower cost drop structure than conventional designs.

With reference to FIGS. 3 and 4, the array 360 is preferably an over pumped array as described above, though other types of amplifiers 360 may be used. If the add/drop module includes the amplifier 32 and/or amplifiers 332, each of those amplifiers may include a GFF for flattening the gain spectrum in the drop side of the add/drop module.

FIG. 11 provides an example of an over pumped add-side amplifier array. Similarly to the drop side, two counter propagating pumps 884 and 886 provide a high level of pump power relative to the signal power in each of the amplifier segments, which results in a fixed gain and no control circuitry is required. The pumps 884 and 886 are connected in a cascade of 16 short pieces of Erbium Fiber such as a fiber piece 888. Due to the high pump power relative to the signal power, the optical amplifiers operate in the linear regime and the gain of the optical amplifiers is fixed, eliminating the need for any complex control circuitry. The array may include dichroic mirrors 890 so as to share the gain power among multiple output sub-beams provided by multiple TOFs or wave blockers, as discussed above with reference to FIG. 10. The optical signal (sub-beam) received at an input port of a particular amplifier is provided, amplified, to an output port of that amplifier, substantially without being directed into another amplifier, differently from the pump light.

Turning now to FIG. 12, an amplifying array is shown wherein a single high power laser diode pump provides constant non-varying light to amplifying sections.

The amplifying array includes a plurality of amplifiers. In the drawing, indices "a" through "n" simply indicate n inputs through same optical elements, or in different words, n amplifiers. The amplifying array includes an isolator 102*a*, and a laser diode optical pump 104 labeled LD coupled together by a wavelength division multiplexer (WDM) 106*a*, and an isolator 116*a*. A block 705*a* represents a serial coupling of short EDF sections having an optional distributed gain flattening medium, also referred to as a gain flattening filter discussed above. WDM 430*a* is provided to remove any remaining pump signal.

It is notable that in FIG. 12 the pump signal provided by laser diode 104 is extracted at WDM 430*a* and is routed into input b of the amplifying array for amplifying the b$^{th}$ input signal. As can be seen, the pump signal is removed and cycled down to each subsequent input line of the amplifying array. In this manner n input signals are amplified and filtered by n GFF+EDF modules 705*a* through 705*n*. The term oversaturation can perhaps be best understood in this regard, since the constant power pump signal must have more than required output power to fully saturate the EDF within the module 705*a* if it is to fully saturate the EDF within 705*n* since it is the remaining unused tapped 980 nm pump light that is directed to a next amplifying input line from the a$^{th}$ to the n$^{th}$.

In the examples illustrated with FIGS. 10 and 11, each array includes two laser pumps, and in the example of FIG. 12—one pump. In other words, an amplifying array may include one or more pumps, though the number of pumps may be kept low, less than the number of amplifiers in the array, which would reduce the cost. The power of the pump light provided by the pump(s) should be sufficient for saturation of the rare earth doped fibers, i.e. greater than the power that the fibers can absorb, easily calculated based on the total length of the doped fiber and the rare earth ion concentration.

The add side amplifiers may be designed so as to achieve gain flatness on all the add paths while requiring only a single GFF in the top amplifier, as illustrated in FIG. 9. The gain flattening requirements are relaxed due to the channel equalization capability of the wave blockers. In the embodiments which use multiple amplifiers 331 between the MCS switches 341 and the splitter(s) 320, each of the amplifiers 331 may include a GFF filter. The amplifier 36 may also include a GFF filter.

Dependent on the performance and cost trade-offs required for a particular application, it is possible to modify the implementation to configure the add/drop module disclosed herein. For example, the power splitter 321 at the input to the drop structure and the power splitter 320 at the output of the add structure may be absent. This can improve the optical signal to noise ratio and reduce the cost when the optical communication system has an adequate number of add/drop ports available on the WSS 21 and does not need port multiplication provided by the power splitters.

Dependent on the noise performance requirements and the power level requirements into and out of the add/drop structure, on the drop side either the input amplifier 32 (FIG. 3) or the amplifier array 332 (FIG. 4) may be absent. This configuration results in a lower cost, size and power for applications where the performance level of the full architecture illustrated in FIG. 4 is not required.

Finally, on the add side either the input amplifier array 361 and wave blockers 351 or the output amplifier 36 (FIG. 3) may be absent from the add side if the performance requirements are relaxed. This can again reduce the cost, size and power requirements for applications where the level of performance of the implementation shown in FIG. 4 is not required. Since the over pumped amplifiers have la imitation of max output power (less than 12 dBm to keep constant gain), if higher output power is desired, other types of amplifiers may be used for add path.

Advantageously, the proposed add/drop module supports a higher number of add/drop TRs than conventional designs. The add/drop system disclosed herein provides better OSNR performance due to the noise suppression by the wave blockers or optical filters, and also provides better isolation than competing N×M WSS technologies. The technical solution disclosed herein also enables contentionless and delivers all of this at a lower cost than competing designs. The add/drop structure disclosed herein is compatible with WSS blocks that utilize either a power splitter or a WSS module on the line in side. As such it is suitable for being deployed as an upgrade to the existing ROADM deployments most of which utilize a power splitter on the line in side. Further, since it requires fewer WSS ports to be used for add/drop, higher degree nodes can be supported with lower port count WSS modules, further extending the utility of the lower cost, lower port count WSS modules.

Notably, the drop-side optical circuit and the add-side optical circuit of any embodiment may be joined together in a same optical system, or may be separate devices, and only one of them may be used in a particular case.

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

The invention claimed is:

1. An optical system comprising a first drop-side optical circuit comprising:
a multicast-and-select (MCS) switch having a plurality of input ports and a plurality of output ports; a plurality of selective devices, each for blocking some of wavelengths of light passing therethrough and for passing at least one other wavelength therethrough so as to provide output to an output port of said selective device, wherein each of the plurality of selective devices has an input port optically coupled to an output port of the MCS switch; and, an optical amplifying array comprising a plurality of optical amplifiers, each having an input port optically coupled to one of the selective devices for receiving an optical signal to be amplified, wherein each of the plurality of optical amplifiers comprises one or more rare earth doped optical fibers for amplifying an optical signal propagating therethrough and has an output port for providing an amplified optical signal; wherein the optical amplifying array has a single laser pump or two counter propagating laser pumps for providing constant pump light sufficient to fully saturate all of the rare earth doped optical fibers in the optical amplifying array and for making the optical amplifying array an over pumped amplifier array; wherein each of at least some of the optical amplifiers has a pump light port for receiving at least a portion of the pump light from the single laser pump or two counter propagating laser pumps or from another of the optical amplifiers, and wherein at least one of the optical amplifiers is connected to receive a portion of the pump light from another of the optical amplifiers, and wherein the first drop-side optical circuit comprises an input amplifier optically coupled to an input port of the MCS switch wherein the input amplifier comprises a gain flattening filter (GFF).

2. The optical system defined in claim 1, wherein the plurality of selective devices comprise wave blockers or tunable optical filters.

3. The optical system defined in claim 2, wherein the first drop-side optical circuit comprises: a first power-splitting circuit comprising one or more power splitters and one or more amplifiers, wherein the first power-splitting circuit has an input port and output ports, and wherein one or more of the output ports of the first power-splitting circuit are optically coupled to one or more of the plurality of input ports of the MCS switch.

4. The optical system defined in claim 3, wherein the input port of the first power-splitting circuit is (a) an input port of one of the one or more amplifiers wherein an output port of said amplifier is optically coupled to the input port of one of the power splitters, or (b) an input port of one of the power splitters wherein each of output ports of said power splitter is coupled to an input port of one of the one or more amplifiers.

5. The optical system defined in claim 3, wherein each of the one or more amplifiers comprises (a) a gain flattening filter or (b) one or more of rare earth doped optical fibers configured for balancing gain along each of drop optical paths in the first drop-side optical circuit.

6. The optical system defined in claim 2, comprising a second drop-side optical circuit, wherein the second drop-side optical circuit comprises: a multicast-and-select (MCS) switch having a plurality of input ports and a plurality of output ports; a plurality of selective devices, each for blocking some of wavelengths of light passing therethrough and passing at least one other wavelength therethrough so as to provide output to an output port of said selective device, wherein each of the plurality of selective devices has an input port optically coupled to an output port of the MCS switch; and, an optical amplifying array comprising a plurality of optical amplifiers, each having an input port optically coupled to one of the selective devices for receiving an optical signal to be amplified, wherein each of the plurality of optical amplifiers comprises one or more rare earth doped optical fibers for amplifying an optical signal propagating therethrough and has an output port for providing an amplified optical signal; wherein the optical amplifying array of the second drop-side optical circuit has a single laser pump or two counter propagating laser pumps for providing constant pump light sufficient to fully saturate all of the rare earth doped optical fibers in said optical amplifying array and for making said optical amplifying array an over pumped amplifier array; wherein each of at least some of the optical amplifiers of said optical amplifying array has a pump light port for receiving at least a portion of said pump light from the single laser pump or two counter propagating laser pumps of said optical amplifying array or from another of the plurality of optical amplifiers of said optical amplifying array; and, wherein one or more of the plurality of input ports of the MCS of the second drop-side optical circuit are coupled to one or more of the output ports of the power-splitting circuit.

7. The optical system defined in claim 3, comprising a second-power splitting circuit comprising one or more power splitters and one or more amplifiers, wherein the second power-splitting circuit has an input port and output ports, wherein one or more of the plurality of input ports of the MCS of the first drop-side optical circuit are coupled to one or more of the output ports of the second power-splitting circuit, and wherein one or more of the plurality of input ports of the MCS of the second drop-side optical circuit are coupled to one or more of the output ports of the second power-splitting circuit.

8. The optical system defined in claim 2, comprising an add side optical circuit, wherein the add side optical circuit comprises: (a) an add-side optical amplifying array comprising a plurality of optical amplifiers, each having an input port for receiving an optical signal to be amplified, wherein each of the plurality of optical amplifiers comprises one or more rare earth doped optical fibers for amplifying an optical signal propagating therethrough and has an output port for providing an amplified optical signal, wherein the add-side optical amplifying array has a single laser pump or two counter propagating laser pumps for providing constant pump light sufficient to fully saturate all of the rare earth doped optical fibers in the add-side optical amplifying array and for making the add-side optical amplifying array an over pumped amplifier array and for making the optical amplifying array an over pumped amplifier array, and wherein each of at least some of the optical amplifiers of the add-side optical amplifying array has a pump light port for receiving at least a portion of said pump light from the single laser pump or two counter propagating laser pumps of the add-side optical amplifying array or from another of the plurality of optical amplifiers of the add-side optical amplifying array; wherein the add side optical circuit further comprises: a plurality of add-side selective devices, each for blocking some of wavelengths of light passing therethrough and for passing at least one other wavelength therethrough so as to provide output to an output port of said selective device, wherein each of the plurality of add-side selective devices has an input port optically coupled to an output port of one of the plurality of amplifiers in the add-side optical amplifying array; and, an add-side multicast-and-select switch having a plurality of input ports and a plurality of output ports, wherein each of the plurality of input ports is optically coupled to an output port of one of the plurality of add-side selective devices; or (b) an add-side MCS switch and an amplifier coupled to an output port of the add-side MCS switch.

9. An optical system comprising an add side optical circuit, wherein the add side optical circuit comprises an add-side optical amplifying array comprising a plurality of optical amplifiers, each having an input port for receiving an optical signal to be amplified, wherein each of the plurality of optical amplifiers comprises one or more rare earth doped optical fibers for amplifying an optical signal propagating therethrough and has an output port for providing an amplified optical signal, wherein the add-side optical amplifying array has a single laser pump or two counter propagating laser pumps for providing constant pump light sufficient to fully saturate all of the rare earth doped optical fibers in the add-side optical amplifying array and for making the optical amplifying array an over pumped amplifier array, and wherein each of at least some of the optical amplifiers in the add-side optical amplifying array has a pump light port for receiving at least a portion of said pump light from the single laser pump or two counter propagating laser pumps of the add-side optical amplifying array or from another of the plurality of optical amplifiers of the add-side optical amplifying array, and wherein at least one of the optical amplifiers is connected to receive a portion of the pump light from another of the optical amplifiers; wherein the add side optical circuit further comprises: a plurality of add-side selective devices, each for blocking some of wavelengths of light passing therethrough and for passing at least one other wavelength therethrough so as to provide output to an output port of said selective device, wherein each of the plurality of add-side selective devices has an input port optically coupled to an output port of one of the plurality of amplifiers in the add-side optical amplifying array, and an add-side multicast-and-select switch having a plurality of input ports and a plurality of output ports, wherein each of the plurality of input ports is optically coupled to an output port of one of the plurality of add-side selective devices, and wherein the add side optical circuit comprises a gain flattening filter (GFF).

10. The optical system defined in claim 9, further comprising another add-side optical circuit and a combining circuit comprising a power splitter and one or more amplifiers, wherein input ports of the combining circuit are coupled to receive light from the two add-side optical circuits.

11. The optical system defined in claim 2, comprising a second-power splitting circuit comprising one or more power splitters and one or more amplifiers, wherein the second power-splitting circuit has an input port and output ports, wherein one or more of the plurality of input ports of the MCS of the first drop-side optical circuit are coupled to one or more of the output ports of the second power-splitting circuit, and wherein one or more of the plurality of input ports of the MCS of the second drop-side optical circuit are coupled to one or more of the output ports of the second power-splitting circuit.

* * * * *